July 2, 1929.  E. G. DANIELSON  1,719,290
GEAR MOLDING PROCESS
Filed June 8, 1927
FIG.1.
FIG.2.
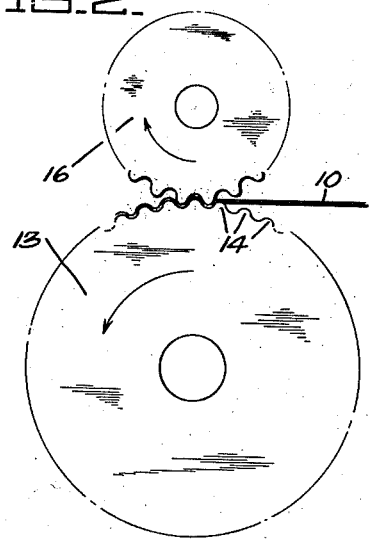
FIG.3.
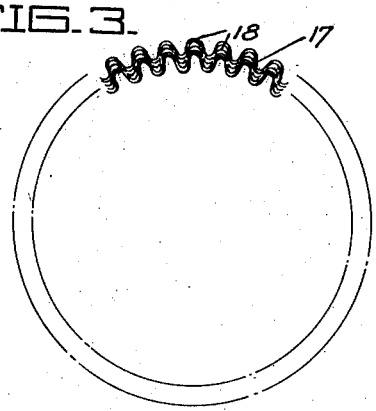
FIG.7.
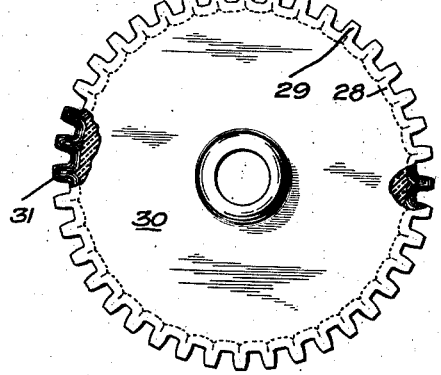
FIG.4.
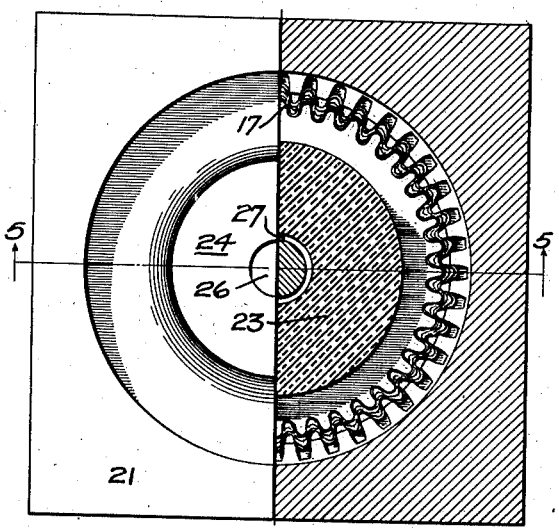
FIG.5.
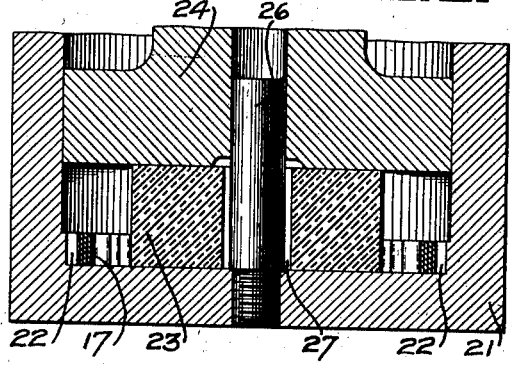
FIG.6.
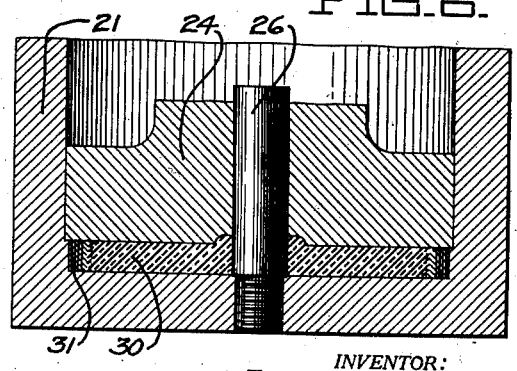
INVENTOR:
Ernest G. Danielson
BY
White, Prost & Fryer
ATTORNEYS.

Patented July 2, 1929.

1,719,290

UNITED STATES PATENT OFFICE.

ERNEST G. DANIELSON, OF SAN FRANCISCO, CALIFORNIA.

GEAR-MOLDING PROCESS.

Application filed June 8, 1927. Serial No. 197,397.

This invention relates generally to a process of manufacturing gears from moldable material, such as a phenolic condensate product, and to a new article of manufacture resulting from the same.

It is an object of this invention to devise a novel process of forming die cast gears from fiber reinforced moldable material.

It is a further object of this invention to devise a process which will materially cheapen the cost of manufacturing gears of moldable material having fiber reinforced teeth.

It is a further object of this invention to devise a novel process of forming gear teeth in moldable material, which will provide fiber reinforcing threads following the general contour of the teeth.

It is another object of this invention to devise a new type of molded gear resulting from the process of this invention.

Further objects of this invention will appear from the following description in which I have set forth the preferred embodiment of my invention. It is to be understood that the appended claims are to be accorded a range of equivalents consistent with the state of the prior art.

Referring to the drawing:

Fig. 1 is a view showing the character of the reinforcing fabric which I prefer to employ in the process of this invention.

Fig. 2 illustrates the manner in which the fabric strip shown in Fig. 1 is wound upon a mandrel to form a ring of gum impregnated reinforcing material.

Fig. 3 is a view showing a ring of impregnated reinforcing material after it has been removed from the mandrel shown in Fig. 2.

Fig. 4 is a plan view of the die employed in this process, with the ring shown in Fig. 3 positioned adjacent the gear teeth of the die.

Fig. 5 is a sectional view taken along the line 5—5 of Fig. 4, illustrating the manner in which the materials forming the gear are assembled preparatory to the final steps of the process.

Fig. 6 is a view of the die similar to Fig. 5, illustrating the step of compressing the body of the gear.

Fig. 7 is a detail view illustrating a complete gear resulting from the process of this invention.

In the manufacture of gears from moldable material, it has been common to employ layers or laminations of fabric for reinforcing the teeth. In manufacturing such gears the layers of fabric are generally impregnated in some suitable binder, such as a phenolic condensate gum, and are then assembled in layers parallel to the gear faces. By the application of heat and pressure, these layers of impregnated fabric are then bonded together to form a composite gear body. The gear teeth must then be milled to the peripheral surface of the resulting blank. In some cases the milling operation is made less expensive by roughly forming the gear teeth outlines in each layer of fabric, so that the finished blank before the milling operation will have roughly formed teeth. In this invention I propose to entirely obviate the necessity of milling the teeth, and at the same time provide a gear in which the teeth are adequately reinforced by impregnated fabric.

The process of this invention may be characterized by the fact that instead of building up the entire gear body of laminations of reinforcing fabric, the fabric is assembled to form an annular ring which is then pressed into die teeth. For example in Fig. 1 there is shown a strip 10 of suitable fabric such as is ordinarily employed in reinforcing objects made of phenolic condensate products. This strip is about the same width as the width of the face of the gear which it is desired to manufacture, and preferably has a pronounced warp extending longitudinally of the strip. For example threads 11 constituting the warp, are much heavier than the threads 12 which form the woof of the fabric. This strip is impregnated or dipped in a suitable binding material, such as what is commonly known as phenolic condensate gum, and is then wound upon a mandrel 13 such as shown in Fig. 2. Several layers of the fabric are wound about the mandrel so as to form a substantial ring of reinforcing material. For a reason which will presently be apparent, it is desirable to provide this ring with corrugations. One convenient way to form such corrugations is to provide the face of the mandrel 13 with corrugations 14 as shown, and a corrugated idler wheel 16 may be provided to insure forming similar corrugations in the fabric as it is wound upon the mandrel. After a sufficient number of layers have been applied, the fabric is slipped off in the form of a ring 17 such as shown in Fig. 3, this ring being provided with the corrugations 18.

The subsequent steps of the process are performed in a die such as shown diagrammatically in Figs. 4, 5 and 6. This structure utilizes a die block 21 having formed therein the die gear teeth 22 which are complementary to the gear teeth desired upon the final product. The ring 17 is constructed of such size that it will slip within the die with its outer periphery,—or inner periphery in case of an internal tooth gear,—adjacent the die teeth 22. After inserting the ring 17 in position, a slug 23 of some suitable moldable material, such as a suitable phenolic condensate product, is positioned within the die below the plunger 24. In case a central pin 26 is provided in the die for forming a central aperture in the finished product, it is obvious that slug 23 should also be provided with a central aperture 27. The slug is preferably preheated to a moldable or plastic temperature before insertion in the die, and the entire die is also preferably heated so that the material is formative under pressure. Plunger 24 is then forced downwardly to compress the slug 23, and as the vertical dimension of this slug is decreased it naturally expands in a radial direction against the inner periphery of the reinforcing ring 22. During the final movement of the plunger relatively great pressure is applied to slug 23, and this pressure pushes radially against the inner periphery of ring 17 to force the ring into the die teeth 22. The corrugations 18 provide sufficient length of material in the ring so that the gum dipped fabric will conform to the contour of the die teeth without stretching of the fabric threads. At this time the layers of fabric are also forced together under high pressure so that the reinforcing ring becomes one solid mass of composite material, and is also effectively bonded to the material of the slug 23.

The final product when removed from the die will be somewhat as shown in Fig. 7. Thus the slug 23 will have formed a body 30, and the ring 17 will have formed a peripheral portion 28 of fabric reinforced moldable material. Gear teeth 29 are accurately impressed in the peripheral portion 28, and at least the outer layers of fabric 31 follow substantially the contour of the gear teeth. It is obvious that this arrangement of the fabric effectively reinforces the gear teeth against bending adjacent their bases, where normally the gear teeth are apt to break. As the heavier reinforcing threads 12 run substantially parallel to the gear faces, the bearing surfaces of the gear are formed of impregnated fabric rather than by the phenolic condensate product alone, and therefore the gear is more silent in operation than the ordinary type of composite gear. In other words the particular manner in which I reinforce the gear teeth causes a cushioning effect in addition to providing adequate reinforcing.

It is obvious that a gear constructed according to this process may be manufactured much more cheaply than the usual type of molded gear which requires subsequent milling. A minimum amount of reinforcing fabric is required and therefore only a small amount of phenolic condensate gum, which is used in impregnating this fabric, is necessary. This phenolic condensate gum is relatively expensive compared to ordinary molding materials, and is a substantial item in the cost of gears which require a large amount of gum dipped reinforcing fabric. The greater portion of the gear of my invention, may be formed of a relatively cheap moldable material, which however provides sufficient strength to carry the torsional stresses placed upon the gear.

It is obvious that the above process is capable of many modifications. For example the corrugations in the ring 17 may not be applied while winding the fabric strip 10, but may be applied to the ring at any time before insertion in the die. The nature of these corrugations is not material, as their only function is to provide sufficient length so that the fabric may be readily forced into the die teeth. It is preferable however to have the pitch of these corrugations about equal to the pitch of the gear teeth. It is also to be understood that the process is applicable to a variety of gears, such for example as internal tooth gears and gear racks, as well as the ordinary types of gear wheels and pinions.

I claim:

1. A process of forming a gear which utilizes a ring of binder impregnated reinforcing material for forming the peripheral portion of the wheel and a moldable substance for forming the gear body, said process comprising applying a molding pressure to said substance whereby it is caused to press radially upon one peripheral surface of the ring to force said ring into adjacent die teeth.

2. A process of forming a gear having a body of moldable substance and a peripheral portion of moldable fiber reinforced material, said process comprising forming a corrugated ring of said material, placing said ring within a die having annular gear teeth complementary to those desired on the finished gear, and molding said body about one peripheral surface of said ring by application of pressure to the moldable substance, said pressure being sufficient to force said ring into the die teeth, said corrugations serving to provide a ring of sufficient peripheral dimension whereby it may conform to the die teeth without material stretching.

3. A process of making a gear having a body of a phenolic condensate product and a peripheral portion of fiber reinforcing material impregnated with a phenolic condensate gum and formed to provide gear teeth, said process comprising forming a corrugated ring of said gum impregnated material, placing said ring within a die having annular gear teeth complementary to those desired of the finished gear, and molding said body about one peripheral surface of the ring by application of pressure to the same, said pressure being sufficient to force said ring into the die teeth and to form an effective bond between the body and said ring.

In testimony whereof, I have hereunto set my hand.

ERNEST G. DANIELSON.